(12) United States Patent
Nankumo et al.

(10) Patent No.: US 7,277,364 B2
(45) Date of Patent: Oct. 2, 2007

(54) MAGNETO-OPTICAL RECORDING MEDIUM DEVICE

(75) Inventors: Nobuyuki Nankumo, Kawasaki (JP); Takehiko Numata, Kawasaki (JP); Shigenori Yanagi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 592 days.

(21) Appl. No.: 10/722,649

(22) Filed: Nov. 26, 2003

(65) Prior Publication Data

US 2004/0114471 A1    Jun. 17, 2004

Related U.S. Application Data

(63) Continuation of application No. PCT/JP01/04684, filed on Jun. 1, 2001.

(51) Int. Cl.
*G11B 11/00*    (2006.01)

(52) U.S. Cl. .................. 369/13.14; 369/13.24

(58) Field of Classification Search ............ 369/13.14, 369/13.24, 13.25, 13.02, 13.01, 13.23, 13.22, 369/13.18, 13.27, 13.32; 360/59
See application file for complete search history.

(56) References Cited

U.S. PATENT DOCUMENTS 4,890,178 A * 12/1989 Ichihara ................. 369/13.1
5,959,942 A    9/1999 Taguchi et al.
6,018,505 A    1/2000 Miyatake et al.
6,731,446 B2 * 5/2004 Ikeda et al. ................. 360/59

FOREIGN PATENT DOCUMENTS

| EP | 0 398 652 | 10/1990 |
|----|-----------|---------|
| EP | 0 417 858 | 3/1991 |
| JP | 1-319146 | 12/1989 |
| JP | 2-156450 | 6/1990 |
| JP | 05-303790 | 11/1993 |
| JP | 6-119604 | 4/1994 |
| JP | 8-241544 | 9/1996 |
| JP | 9-198734 | 7/1997 |
| JP | 9-204706 | 8/1997 |
| JP | 10-188202 | 7/1998 |
| JP | 10-188385 | 7/1998 |
| JP | 11-238264 | 8/1999 |
| JP | 2002-298461 | 10/2002 |

* cited by examiner

*Primary Examiner*—Ali Neyzari
(74) *Attorney, Agent, or Firm*—Greer, Burns & Crain, Ltd.

(57) ABSTRACT

A magneto-optical recording medium device of the present invention optimizes a magnetic field forming the front mask and a magnetic field forming the rear mask by use of a single bias magnetic field generator, by shifting the peak position of the bias magnetic field in the magneto-optical recording medium device so as to deviate from the center of the laser beam spot in a tangential direction of the magneto-optical recording medium, enabling extended recording and reproduction margins.

6 Claims, 8 Drawing Sheets

FIG. 6(a) LAND PORTION
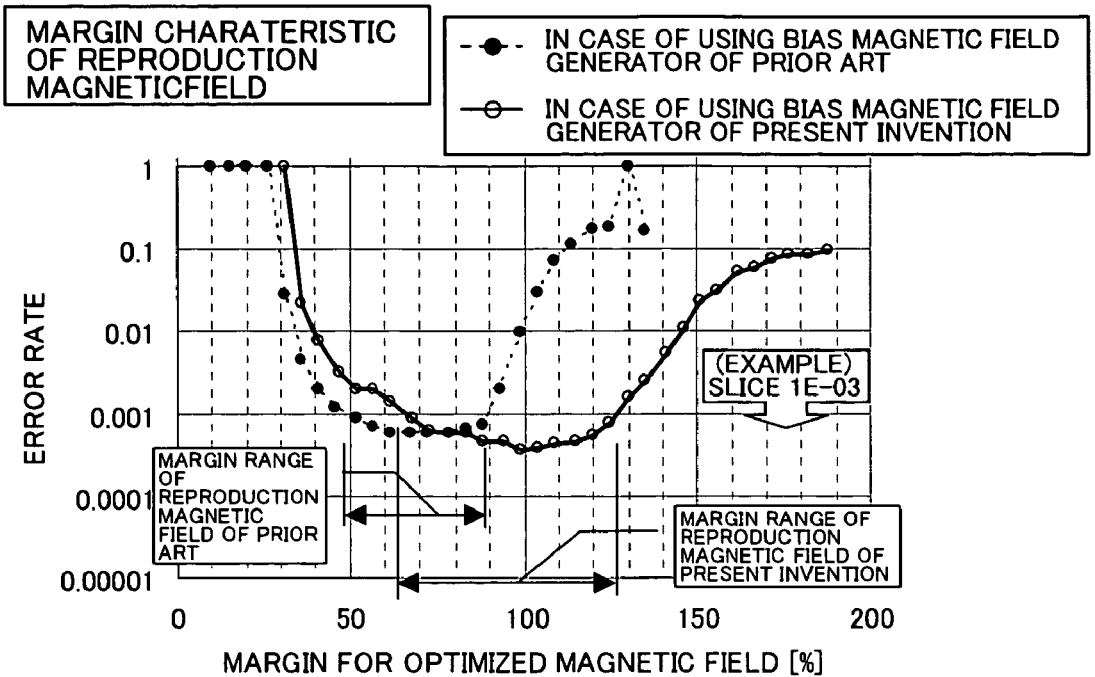
FIG. 6(b) GROOVE PORTION
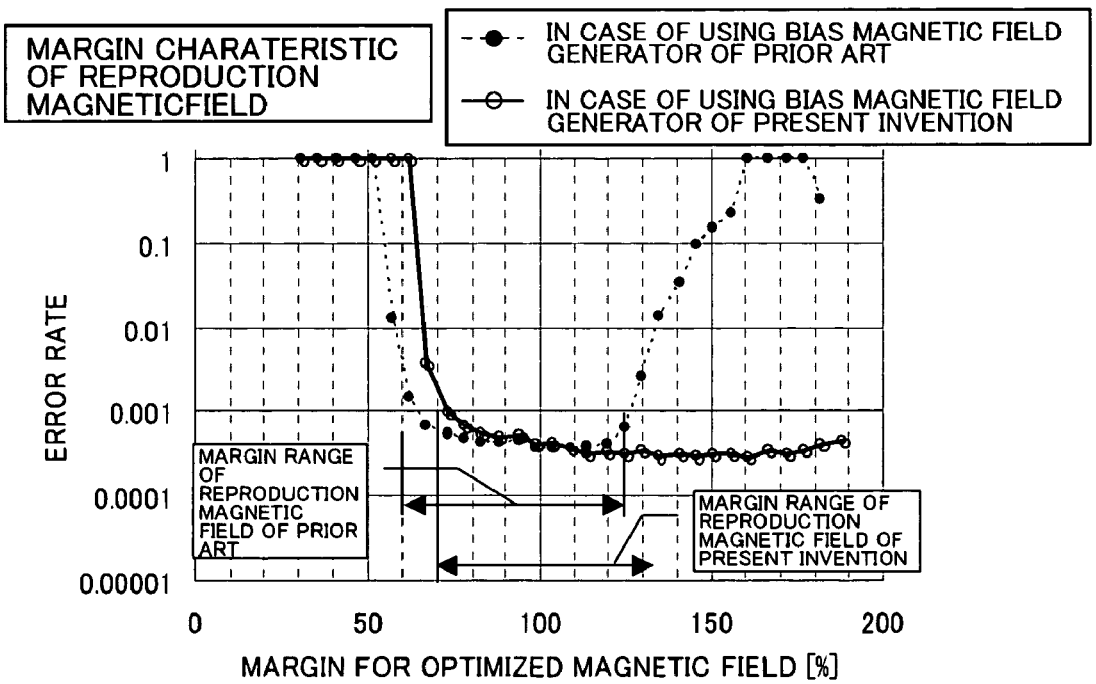

MAGNETO-OPTICAL RECORDING MEDIUM DEVICE

This is a continuation of International PCT Application Ser. No. PCT/JP01/04684 filed Jun. 1, 2001.

FIELD OF THE INVENTION

The present invention relates to a magneto-optical recording medium device which records and reproduces information on and from a magneto-optical recording medium, and more particularly a magneto-optical recording medium device enabling recording and reproduction by employing magnetic super-resolution (MSR) technology.

BACKGROUND ART

As a method for obtaining a magneto-optical recording medium with higher recording density, a double-mask rear aperture detection (D-RAD) employing the magnetic super resolution (MSR) technology is known. In the D-RAD scheme, a front mask and a rear mask are formed before and behind a mark recorded on the magneto-optical recording medium, thereby virtually narrowing a spot diameter of a laser beam radiated on the magneto-optical recording medium to improve recording and reproduction resolution.

FIG. 10 shows a diagram illustrating the reproduction principle in the D-RAD scheme. In FIG. 10, the magneto-optical recording medium corresponding to the D-RAD has a three-layer structure consisting of recording layer, intermediate layer and reproduction layer. Rotating such a magneto-optical recording medium produces temperature distribution in a laser spot S, forming a low-temperature zone, a high-temperature zone, and a medium-temperature zone existent therebetween. When reproducing from the medium, applying a bias magnetic field (reproduction magnetic field) Hr produces dominant magnetization in the intermediate layer in the low-temperature zone, causing magnetization in the intermediate layer aligned in the direction of the bias magnetic field Hr. At the same time, magnetization in the reproduction layer is also aligned so as not to form an interface magnetic wall, and thus a front mask is generated. In contrast, in the high-temperature zone, magnetization in the reproduction layer becomes dominant. This produces magnetization in the reproduction layer aligned with the bias magnetic field Hr, and thus a rear mask is generated. There is an aperture in the medium-temperature zone existent between the front mask and the rear mask, and a bit in the recording layer is transcripted to the reproduction layer through the intermediate layer, and the bit is read out. In such a way, because the bit is reproduced only from the medium-temperature zone (aperture) in the laser beam spot S, the spot diameter becomes virtually narrower, and thus improved reproduction resolution is obtained.

FIG. 11 shows a diagram illustrating positional relation between a bias magnetic field generator and a laser beam spot in the conventional magneto-optical recording medium device. In FIG. 11, a laser beam is irradiated from one face side of the magneto-optical recording medium, while the bias magnetic field is applied from the other face side by the bias magnetic field generator. The bias magnetic field generator is constituted of an electromagnet having a coil wound around a yoke. Further, a cross section of the yoke illustrated (the cross section on the radius direction) is structured left-right symmetric against the center line C1 of the yoke, as an example, with a rectangular form. Further, the bias magnetic field generator is disposed so that the center of the irradiated laser beam spot is aligned on the same line as the center line C1.

FIG. 12 is a diagram illustrating relation between the distance from the center of the yoke and the magnitude (ratio) of the generated bias magnetic field. In FIG. 12, the peak location (100%) of the bias magnetic field is aligned on the same line as the center line of the laser beam spot. Accordingly, the bias magnetic field becomes left-right symmetric before and behind the track in the medium rotation direction positioned at the center of the laser beam spot. This produces identical magnitude of the magnetic field forming the front mask to the magnitude of the magnetic field forming the rear mask.

In such a way, in order to detect microscopic bits recorded in high density, the front mask and the rear mask are produced by the bias magnetic field, as shown in FIG. 10. Here, in the front mask, it is necessary to align the reproduction layer orderly in the ERASE direction. For this purpose, it is desirable that the magnitude of the magnetic field forming the front mask be comparatively large. Further, as for the size of the rear mask, it is necessary to limit the size within a predetermined value from the viewpoint of crosstalk with the neighboring track. Therefore, it is desirable that the magnitude of the magnetic field forming the rear mask be comparatively small. If the magnetic field forming the rear mask is set too large in magnitude, an aperture is produced also in the neighboring track because of the extended rear mask area, causing crosstalk by which the bit on the neighboring track is reproduced.

DISCLOSURE OF THE INVENTION

It is an object of the present invention to provide a magneto-optical recording medium device producing a bias magnetic field so that the magnetic field forming a front mask and the magnetic field forming a rear mask produced by the bias magnetic field are optimized in magnitude.

In order to attain the aforementioned object, the magneto-optical recording medium device according to the present invention, the magnetic field forming the front mask and the magnetic field forming the rear mask are optimized with the peak location of the bias magnetic field deviating against the center of the laser beam spot in the approximate track direction including the tangential direction of the track rotation direction.

In order to attain the aforementioned object, as a first configuration of the magneto-optical recording medium device, in the magneto-optical recording medium device at least reproducing information from a magneto-optical recording medium, there are provided an optical head irradiating a light beam onto the magneto-optical recording medium, and a bias magnetic field generator applying a bias magnetic field to the magneto-optical recording medium. In this configuration, the peak position of the bias magnetic field applied by the bias magnetic field generator deviates from the center of a light beam spot irradiated onto the magneto-optical recording medium in a predetermined direction.

As a second configuration of the magneto-optical recording medium device according to the present invention, in the aforementioned first configuration of the magneto-optical recording medium device, the peak position of the bias magnetic field applied by the bias magnetic field generator deviates from the center of the light beam spot irradiated onto the magneto-optical recording medium either forward or backward to the approximate track direction of the magneto-optical recording medium.

As a third configuration of the magneto-optical recording medium device according to the present invention, in the aforementioned first or second configuration, the bias magnetic field generator is structured of an electromagnet which includes a yoke extending along the radius direction of the magneto-optical recording medium and a coil wound around the yoke.

As a fourth configuration of the magneto-optical recording medium device according to the present invention, in the aforementioned third configuration, the bias magnetic field generator is positioned so that the center position of the yoke in the width direction thereof deviates from the center position of the light beam spot in the width direction of the yoke.

As a fifth configuration of the magneto-optical recording medium device according to the present invention, in the aforementioned third configuration, a cross section of the yoke in the radius direction is left-right asymmetric on the magneto-optical recording medium.

As a sixth configuration of the magneto-optical recording medium device according to the present invention, in the aforementioned fifth configuration, the cross section of the yoke is structured of step shape or wedge shape.

As a seventh configuration of the magneto-optical recording medium device according to the present invention, in the aforementioned fifth or sixth configuration, the bias magnetic field generator is positioned so that the center position of the yoke in the approximate track direction coincides with the center position of the light beam spot in the approximate track direction.

As an eighth configuration of the magneto-optical recording medium device according to the present invention, in the aforementioned third configuration, the yoke is formed of a plurality of materials having different residual flux densities in the approximate track direction.

As a ninth configuration of the magneto-optical recording medium device according to the present invention, in the aforementioned eighth configuration, the bias magnetic field generator is positioned so that the center position of the yoke in the approximate track direction coincides with the center position of the light beam spot in the approximate track direction.

As a tenth configuration of the magneto-optical recording medium device according to the present invention, in the magneto-optical recording medium device at least reproducing information from a magneto-optical recording medium, there are provided an optical head irradiating a light beam onto the magneto-optical recording medium, and a bias magnetic field generator applying a bias magnetic field to the magneto-optical recording medium. When reproducing information from a predetermined track of the magneto-optical recording medium, the bias magnetic field generator simultaneously applies a magnetic field for forming a front mask on the track and a magnetic field for forming a rear mask on the track, having different magnitude from the magnitude of the magnetic field for the front mask.

As an eleventh configuration of the magneto-optical recording medium device according to the present invention, in the aforementioned tenth configuration, the peak position of the bias magnetic field is set so that the magnetic field necessary for forming the front mask differs from the magnetic field necessary for forming the rear mask on an arbitrary track.

As a twelfth configuration of the magneto-optical recording medium device according to the present invention, in the magneto-optical recording medium device at least reproducing information from a magneto-optical recording medium housed in a cartridge, there are provided an optical head having an object lens mounted thereon, irradiating a light beam on the magneto-optical recording medium, a cartridge holder holding the cartridge, and a bias magnetic field generator applying a bias magnetic field to the magneto-optical recording medium. The bias magnetic field generator is disposed so as to shift the peak position of the bias magnetic field in the width direction of the cartridge holder against the axis of the object lens.

Further scopes and features of the present invention will become more apparent by the following description of the embodiments with the accompanied drawings.

BRIEF DESCRIPTION OF THE DRAWINGS

FIG. 6 shows a graph illustrating relation between the reproduction error rate of the magneto-optical recording medium device and the ratio (margin) against a bias magnetic field (100%) having a predetermined magnitude.

PREFERRED EMBODIMENTS OF THE INVENTION

The preferred embodiments of the present invention are described hereinafter referring to the charts and drawings. However, the scope of the present invention is not limited to the embodiments described below.

Figure 1:
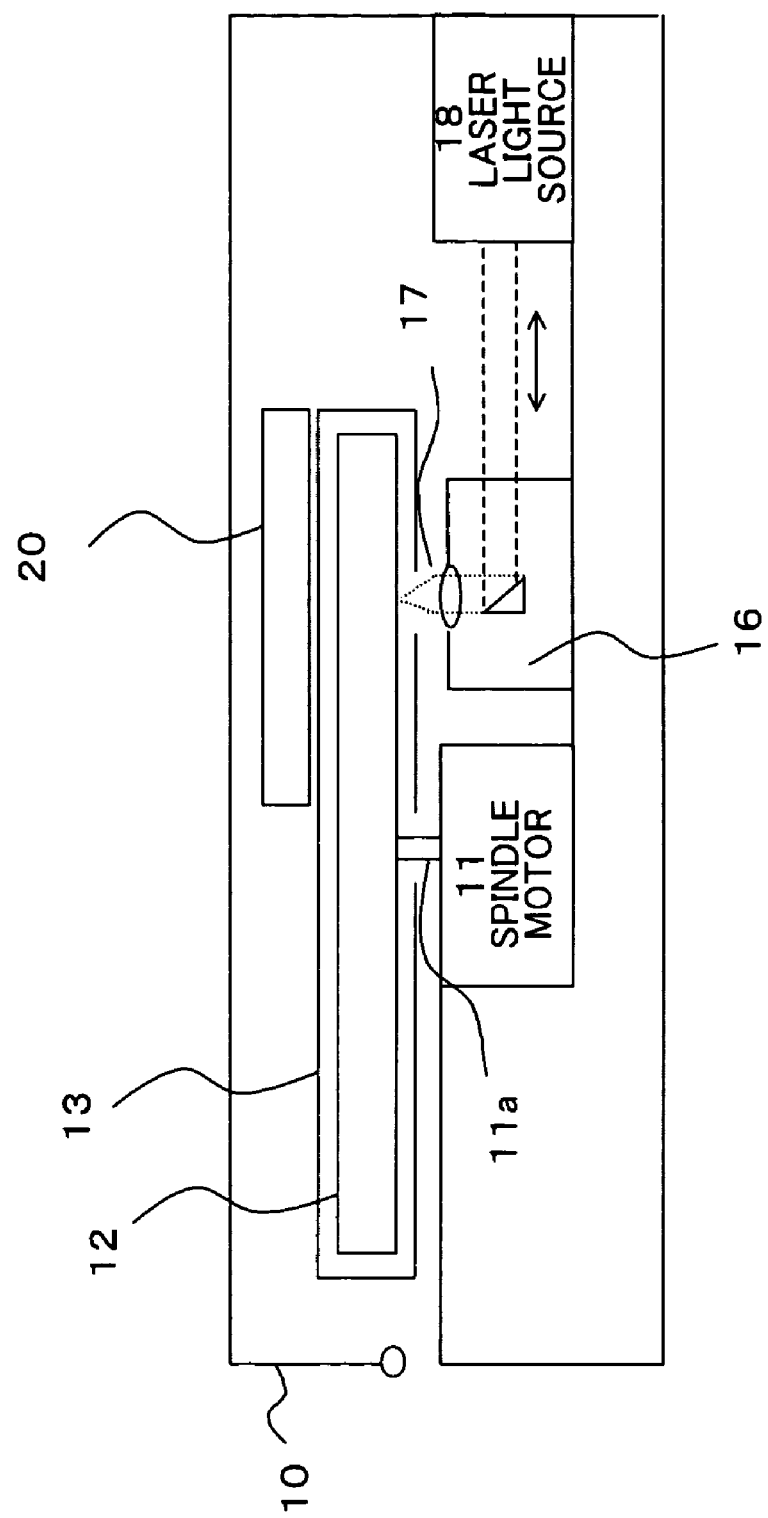
FIG. 1 shows a schematic diagram of the cross-section of a magneto-optical recording medium device according to an embodiment of the present invention.

FIG. 1 shows a diagram illustrating a schematic diagram of a cross-section of the magneto-optical recording medium device according to an embodiment of the present invention. A spindle motor 11 is provided in an inlet door 10. By inserting a cartridge 13 housing a magneto-optical recording medium 12 from inlet door 10, magneto-optical recording medium 12 housed in cartridge 13 is mounted rotatably around a rotation axis (hub) 11a of spindle motor 11.

On one face side of magneto-optical recording medium 12, there is disposed a movable optical head 16 guided to the transverse direction (radius direction) of the tracks of magneto-optical recording medium 12. On optical head 16, there is mounted an object lens 17 on which a laser beam output from a laser light source 18 is incident. Optical head 16 irradiates the laser beam onto the face of magneto-optical recording medium 12. Further, optical head 16 receives reflective light from magneto-optical recording medium 12, and the reflective light is forwarded to a reproduction signal processing means (not shown). The reproduction signal processing means detects the magneto-optical signal from the reflective light and converts the magneto-optical signal into a reproduction signal formed of an electric signal.

Also, on the other face side of magneto-optical recording medium 12, a bias magnetic field generator 20 having a magnetic coil is disposed. At the time of recording and reproduction, bias magnetic field generator 20 applies a bias magnetic field having predetermined magnitude to a position in the vicinity of a laser beam irradiation spot on the face of magneto-optical recording medium 12. Further, the bias magnetic field generated by bias magnetic field generator 20 at the time of recording and reproduction produces both a magnetic field forming a front mask and a magnetic field forming a rear mask.

According to the embodiment of the present invention, in the aforementioned magneto-optical recording medium device, the bias magnetic field produced by bias magnetic field generator 20 is disposed so that the peak position of the bias magnetic field deviates from the center of the laser beam irradiation spot in a predetermined direction, to optimize the magnetic field forming the front mask and the magnetic field forming the rear mask.

Here, the predetermined direction is, for example, an approximate track direction of the magneto-optical recording medium. Preferably, in case of such a disk medium that the tracks of the magneto-optical recording medium extend to the rotation direction, the predetermined direction is a tangential line direction of the track direction (rotation direction).

Figure 2:
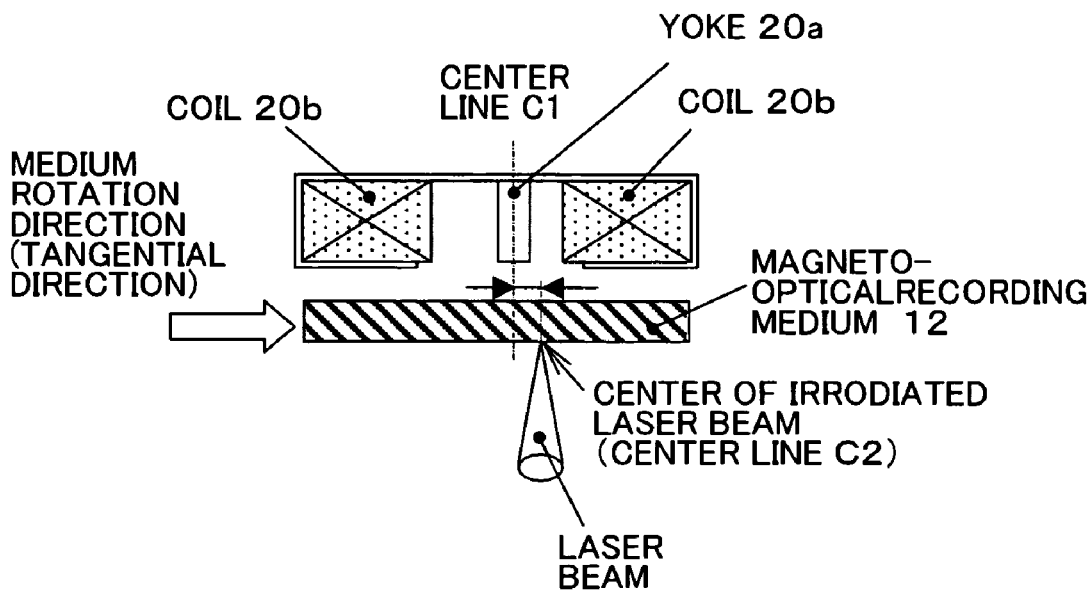
FIG. 2 shows a schematic cross-sectional view of a bias magnetic field generator 20 according to a first embodiment of the present invention.

FIG. 2 shows a schematic cross-sectional view of bias magnetic field generator 20 according to the first embodiment of the present invention. In FIG. 2, the illustrated cross section of yoke 20a of bias magnetic field generator 20 (the cross section in the radius direction) is rectangular, having a left-right symmetrical shape against the center line C1. Further, the center line C1 deviates from the center line C2 of the laser beam spot approximately in the track direction, namely in the direction of the front mask or rear mask forming position on a predetermined track. In the following description of the embodiments, the approximate track direction is exemplified by the tangential line direction (hereafter simply referred to as tangential direction) of the track rotation direction.

Because yoke 20a is left-right symmetric against the center line C1 with a rectangular form, the bias magnetic field produced by bias magnetic field generator 20 has the peak position on the center line C1 of bias magnetic field generator 20. Therefore, the deviation of the center line C1 of bias magnetic field generator 20 from the center line C2 of the laser beam spot (irradiation position) produces change of the magnitude of both the magnetic field forming the front mask and the magnetic field forming the rear mask respectively produced before and behind the spot on the track. By setting the peak position of the bias magnetic field to deviate preferably in the forward direction of the tangential direction, the magnetic field forming the front mask can be made relatively larger, and it becomes possible to optimize the magnetic field forming the front mask and the magnetic field forming the rear mask.

As described above, in order to position the center line C1 of bias magnetic field generator 20 deviating from the center line C2 of the laser beam spot, bias magnetic field generator 20 is so disposed as to deviate from the center of the laser beam spot.

Figure 3:
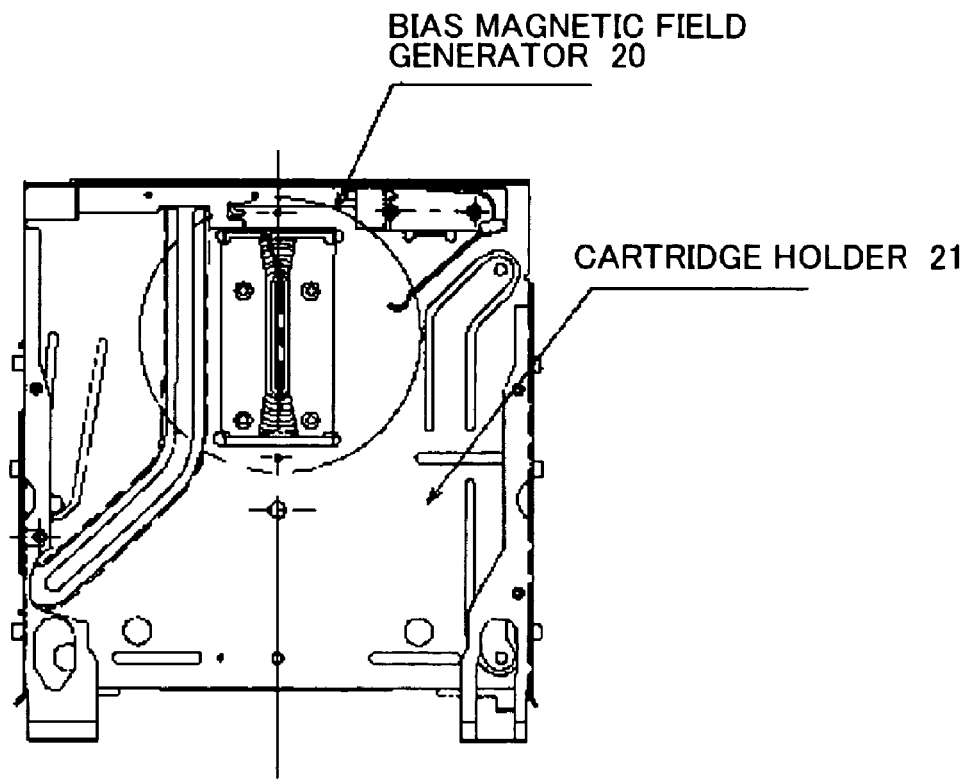
FIG. 3 shows a top plan view of bias magnetic field generator 20 disposed in the position deviating from a laser beam spot.
Figure 4:
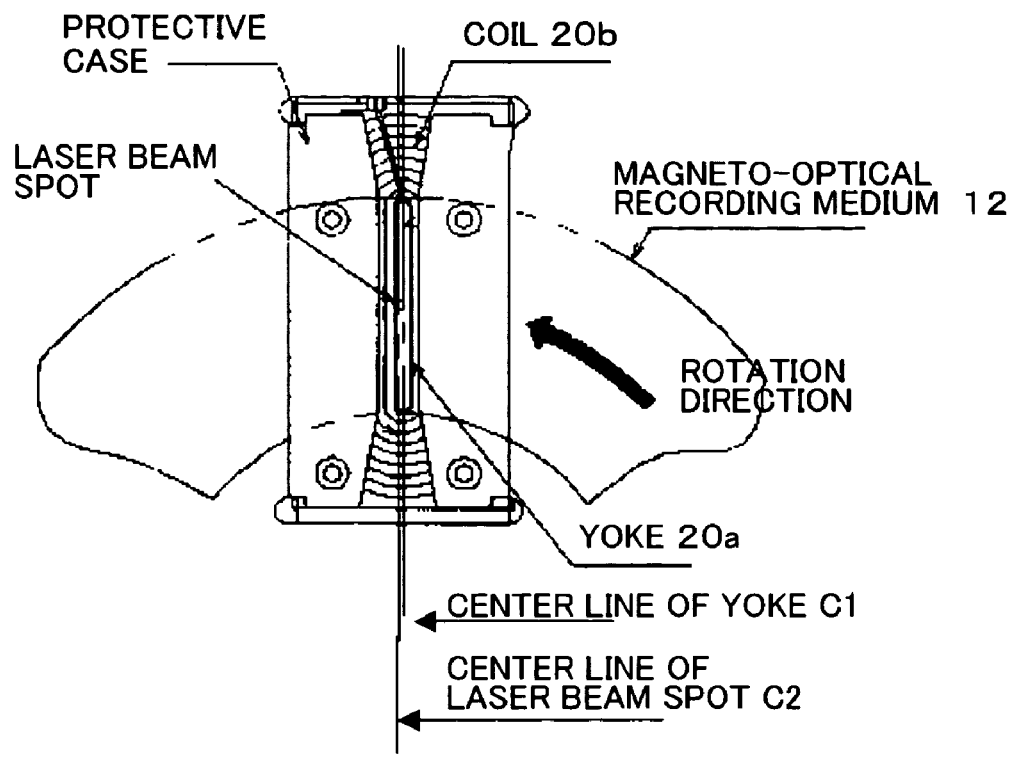
FIG. 4 shows an enlarged view near the circle portion shown in FIG. 3 (bias magnetic field generator).

FIG. 3 is a top plan view of bias magnetic field generator 20 disposed deviating from the center of the laser beam spot, and FIG. 4 is an enlarged view near the circle portion (i.e. the bias magnetic field generator) shown in FIG. 3. In FIGS. 3 and 4, yoke 20a of bias magnetic field generator 20 extends along the radius direction of magneto-optical recording medium 12, around which magnetic coil 20b is wound. The top end of yoke 20a is tapered off in the cross-sectional view, and the top face thereof is flat. Bias magnetic field generator 20 is housed in a protective case. Further, in FIG. 3, a cartridge holder 21 in the magneto-optical recording medium device holds a cartridge 13 inserted from an inlet door 10 shown in FIG. 1. Cartridge holder 21 mounts the hub of magneto-optical recording medium 12 in cartridge 13 onto a turntable of spindle motor 11. As shown in FIGS. 3 and 4, the center line C1 of yoke 20a of bias magnetic field generator 20 is positioned deviating from the center line C2 of the laser beam spot in the tangential direction. Namely, the center line C1 of yoke 20a is positioned (shifted) deviating from the center line C2 of the laser beam spot (or the center line of recording medium 12 or the center line of cartridge holder 21) in the vertical direction against the insertion/ejection direction of recording medium 12 or cartridge 13, in other words, in the width direction of recording medium 12 or cartridge 13, or the width direction of cartridge holder 21.

The deviation length is exemplarily 0.4 mm. According to the experiment result obtained by the inventors of the present invention, the bias magnetic field at the center of the laser beam spot is decreased in the order of 50 Oe (refer to the following FIG. 5).

Figure 5:
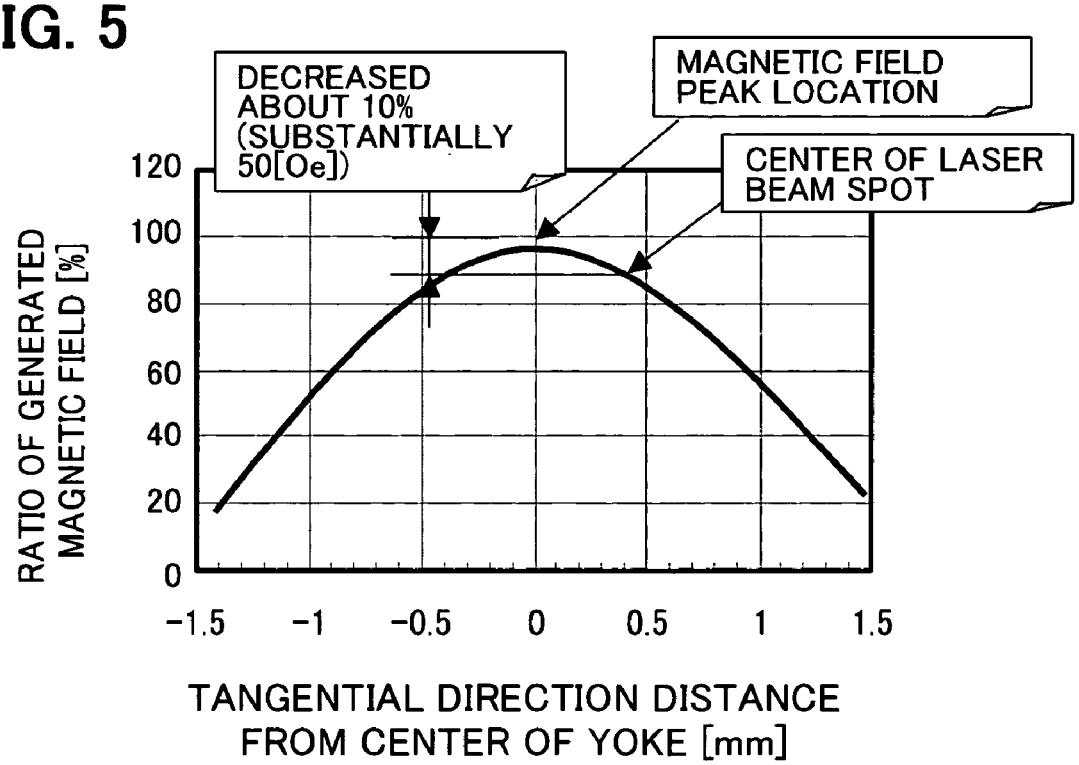
FIG. 5 shows a graph illustrating relation between the distance from the center of the yoke and the magnitude (ratio) of the generated bias magnetic field.

FIG. 5 shows a diagram illustrating relation between the distance from the center of the yoke and the magnitude (ratio) of the generated bias magnetic field according to the first embodiment of the present invention. In FIG. 5, because of the peak position (100%) of the bias magnetic field deviating from the center of the laser beam spot, the bias magnetic field before and behind the center of the laser beam spot in the tangential direction becomes asymmetric, causing varied magnitude of the bias magnetic field. By shifting the peak position of the bias magnetic field forward to the tangential direction, the magnetic field forming the front mask becomes relatively large, and the magnetic field forming the rear mask becomes relatively small.

FIG. 6 shows a graph illustrating relation between the error rate and the ratio (margin) against a bias magnetic field (100%) having a predetermined magnitude in the reproduction magnetic field of the magneto-optical recording medium device. Magneto-optical recording medium 12 has recording bits in both a land portion and a groove portion. FIG. 6(a) shows a graph illustrating the error rates in the land portion of magneto-optical recording medium 12, while FIG. 6(b) shows the error rates in the groove portion of magneto-optical recording medium 12. In FIGS. 6(a) and 6(b), there are plotted the error rates when the magnitude of the bias magnetic field is varied larger and smaller than the predetermined magnitude (100%). For example, supposing the threshold (slice) of the error rate is 1E-03 ($10^{-3}$), the range of the margin in the reproduction magnetic field below the threshold according to the embodiment of the present invention is highly extended, as compared with the range of the margin in the conventional art corresponding to the above case. Particularly, as for the range of the margin in the reproduction magnetic field according to the embodiment of the present invention shown in FIG. 6(b), the error rate can be maintained below the threshold even when the bias magnetic field is varied more than twice (200%) as large as the predetermined magnitude.

As such, the bias magnetic field according to the embodiment of the present invention substantially extends the reproduction/recording margin against the error rate, preventing increase of the error rate caused by the variation of the bias magnetic field. As a result, highly accurate reproduction/recording performance can be obtained, which contributes to improved reliability of the magneto-optical recording medium device.

Figures 7A, 7B:
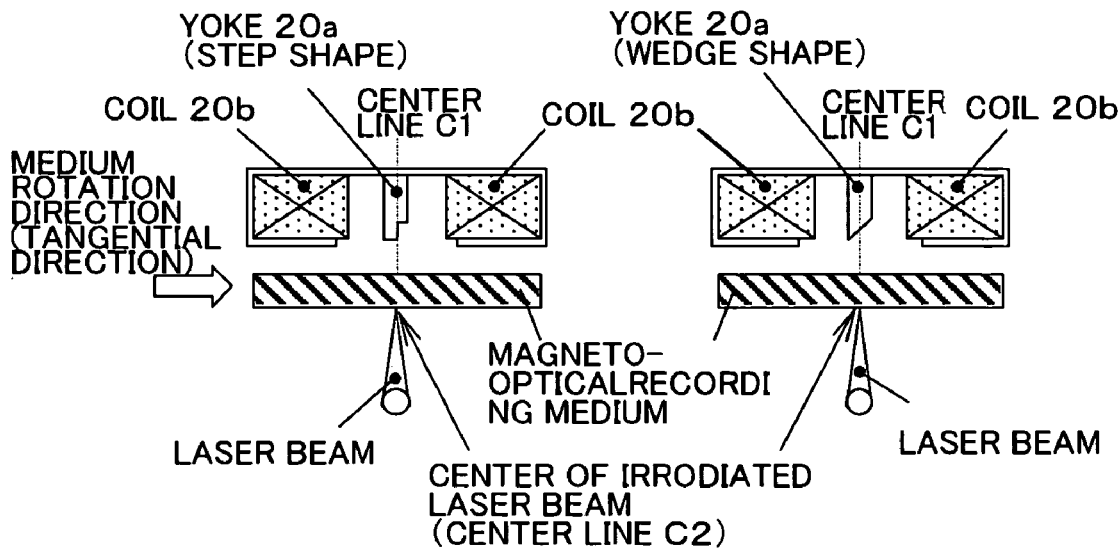
FIG. 7 shows a schematic cross-sectional view of bias magnetic field generator 20 according to a second embodiment of the present invention.

FIG. 7 shows a schematic cross-sectional view of bias magnetic field generator 20 according to a second embodiment of the present invention. In FIG. 7, the center line C1 of bias magnetic field generator 20 is aligned on the same line as the center line C2 of the laser beam spot. However, a cross section of yoke 20a is left-right asymmetric against the center line C1. More specifically, the cross section of the yoke has a step shape extending on the both sides of the center line C1, as shown in FIG. 7(a). Or, as shown in FIG. 7(b), the cross section of the yoke has a wedge shape extending on the both sides of the center line C1. These shapes produce the deviation of the peak position of the bias magnetic field from the center line C1 (that is, the center line C2). Needless to say, in this case also, the center line C1 may be positioned deviating from the center line C2.

Figure 8:
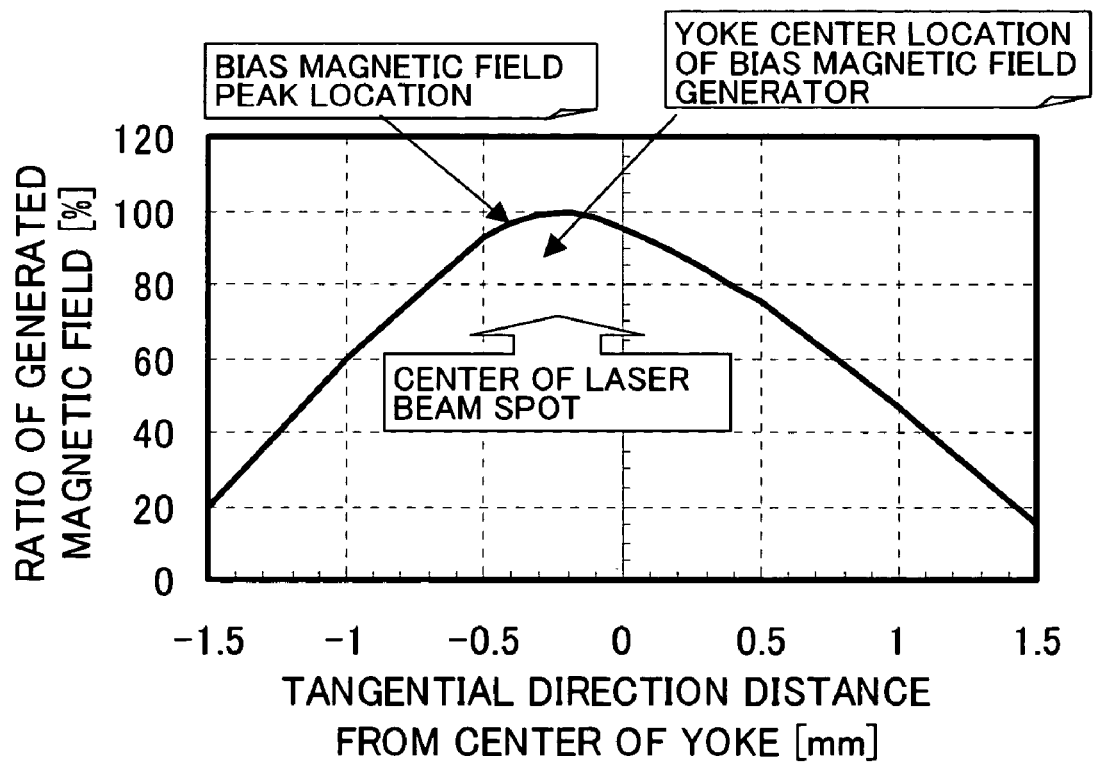
FIG. 8 shows a graph illustrating relation between the distance from the center line C1 of the yoke and the magnitude (ratio) of the generated bias magnetic field according to the second embodiment of the present invention.

FIG. 8 shows a graph illustrating relation between the distance from the center line C1 of the yoke and the magnitude (ratio) of the generated bias magnetic field according to the second embodiment of the present invention. In FIG. 8, the peak position (100%) of the bias magnetic field is existent in a position deviating from the center of the yoke, and the center of the yoke is aligned on the same line as the center of the laser beam spot. As a result, similarly to the case of FIG. 5, the bias magnetic field before and behind the center of the laser beam spot in the tangential direction becomes left-right asymmetric, and the magnitude of the bias magnetic field is varied. By shifting the peak position of the bias magnetic field in the forward rotation direction, the magnetic field forming the front mask becomes relatively larger, while the magnetic field forming the rear mask becomes relatively smaller.

Accordingly, in this case also, the range of the reproduction/recording margin against the error rate is extended, as shown in FIGS. 6(a) and 6(b), which contributes to increased reliability of the magneto-optical recording medium device.

Figure 9:
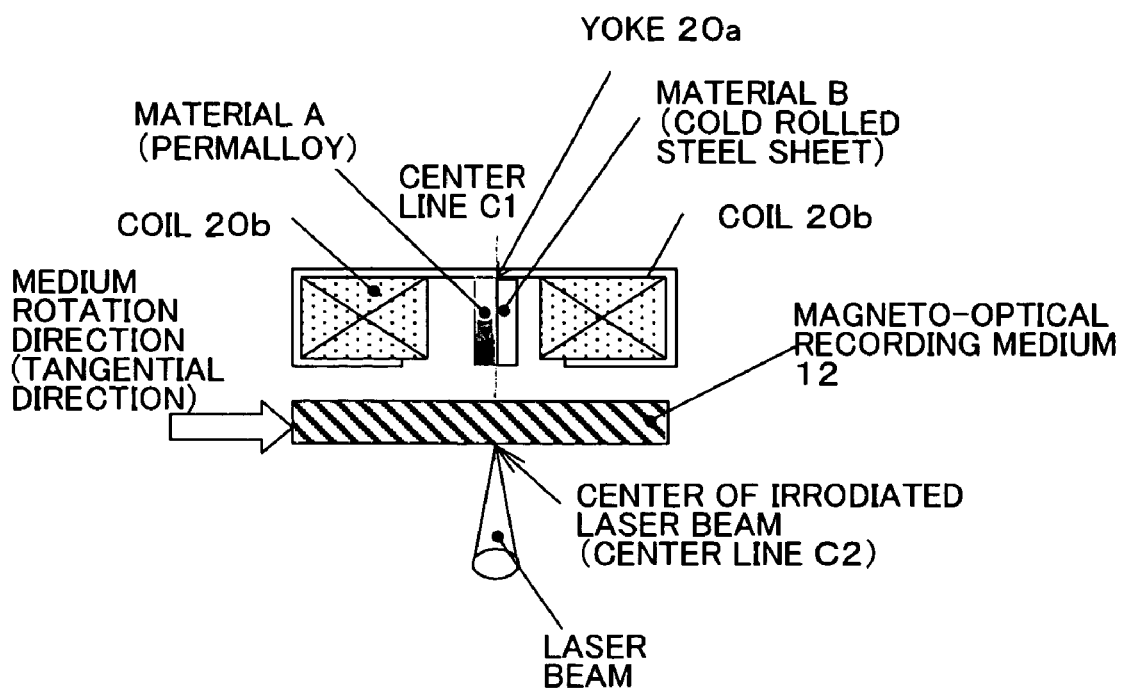
FIG. 9 shows a schematic cross-sectional view of bias magnetic field generator 20 according to a third embodiment of the present invention.
Figure 10:
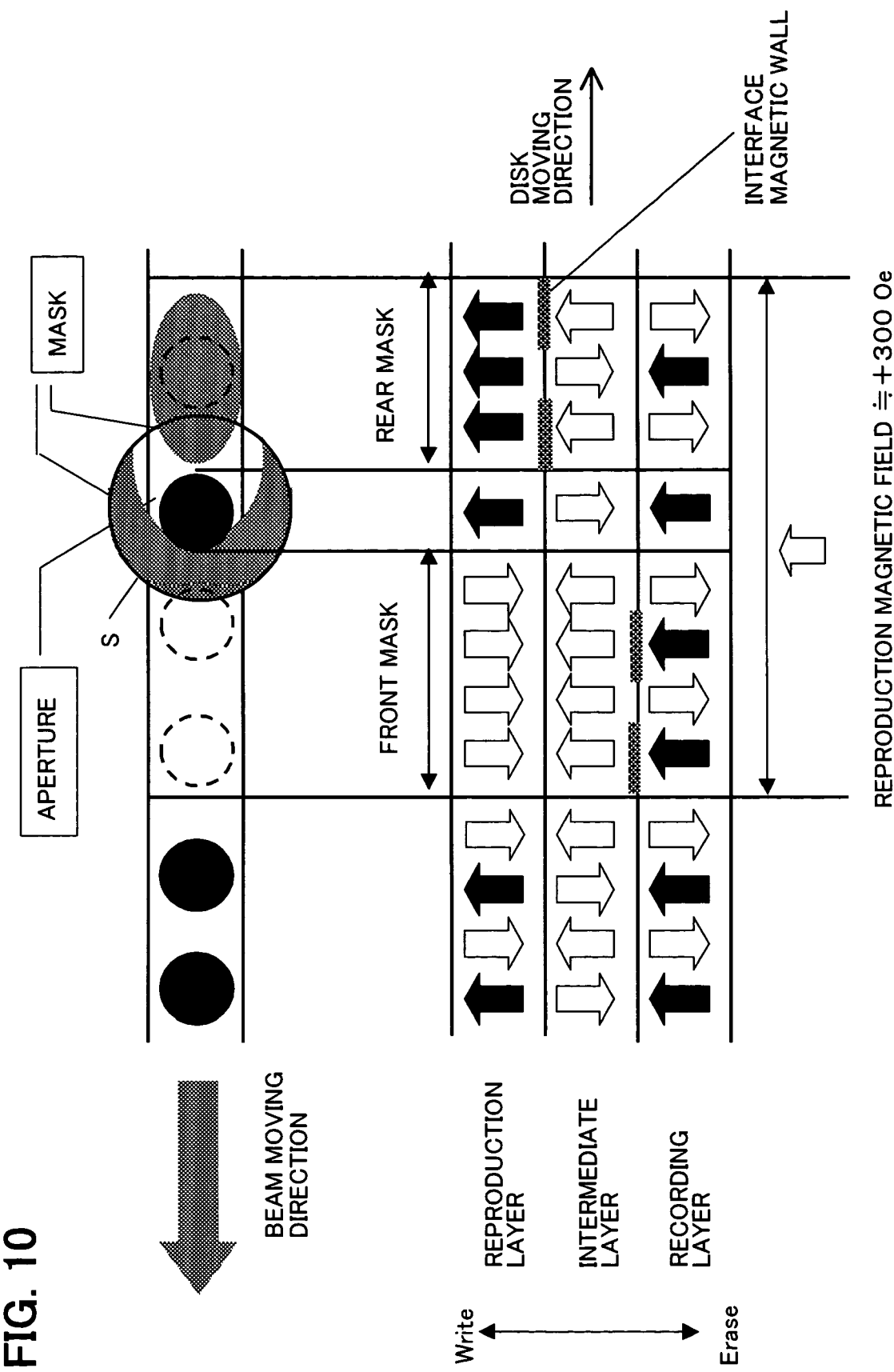
FIG. 10 shows a diagram illustrating the reproduction principle of the D-RAD scheme.
Figure 11:
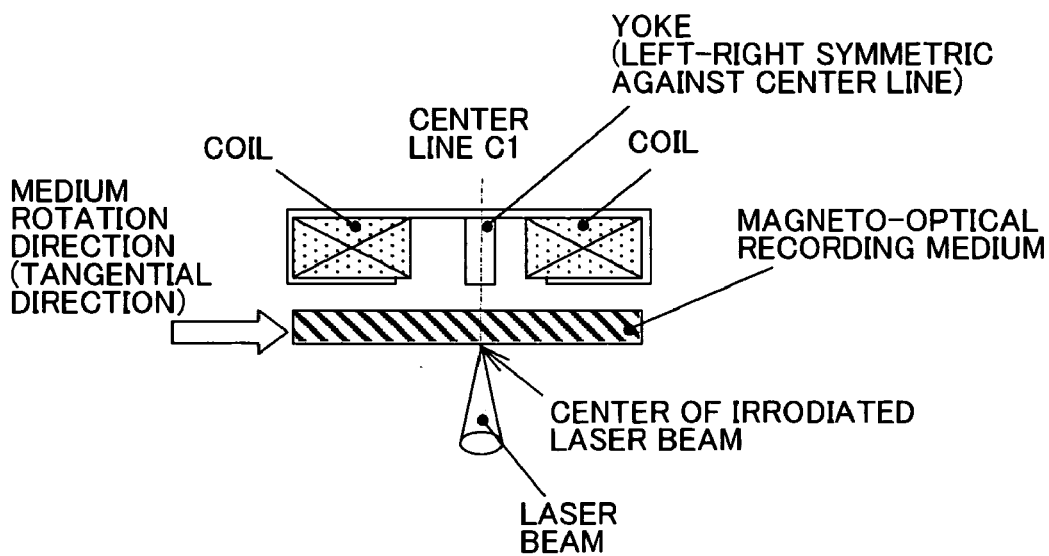
FIG. 11 shows a diagram illustrating positional relation of the bias magnetic field generator and the laser beam spot in the conventional magneto-optical recording medium device.
Figure 12:
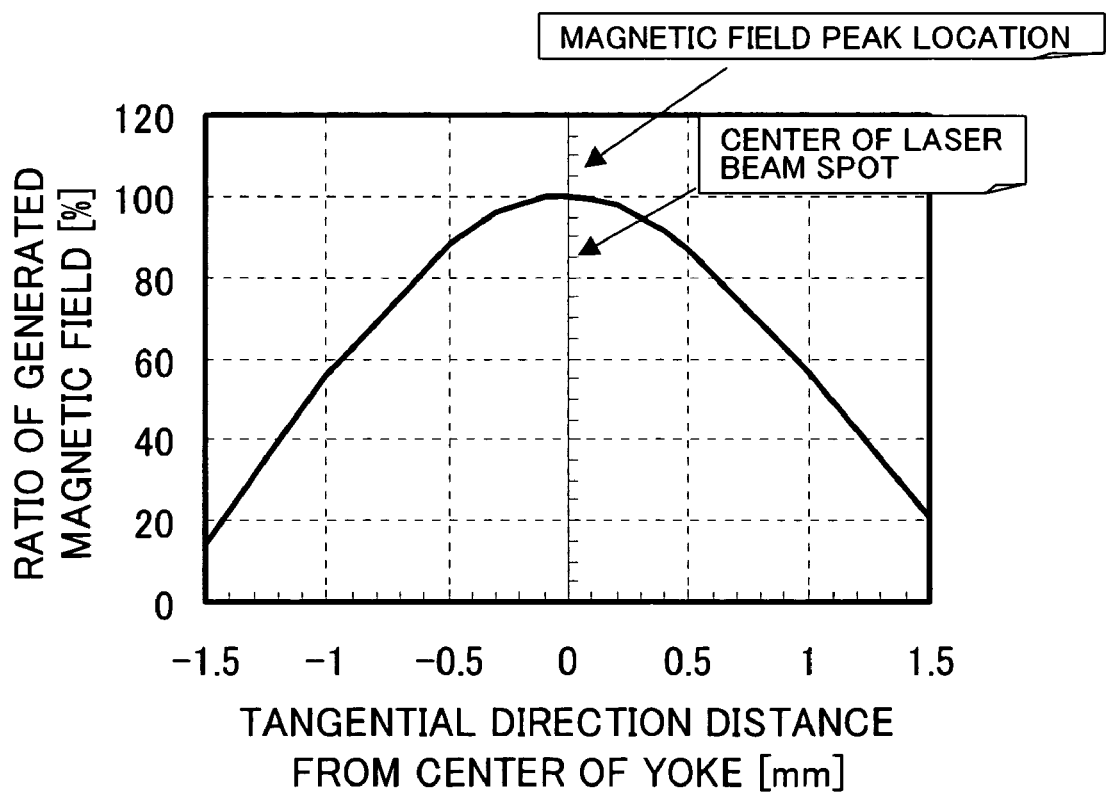
FIG. 12 shows a graph illustrating relation between the distance from the center of the yoke and the magnitude (ratio) of the generated bias magnetic field in the conventional art.

FIG. 9 shows a schematic cross-sectional view of bias magnetic field generator 20 according to a third embodiment of the present invention. In FIG. 9, the center line C1 of bias magnetic field generator 20 is aligned on the same line as the center line C2 of the laser beam spot. However, yoke 20a is formed of a plurality of materials having different residual magnetic flux densities in the rotation direction. For example, yoke 20a is formed of a cold rolled steel sheet clad with permalloy. In this case, the cross section of the yoke may be rectangular as shown in FIG. 9, or of other shapes (for example, step shape or wedge shape). In such a way, by forming the yoke with materials having different residual magnetic flux densities clad with each other on the both sides of the center line C1, it becomes possible to obtain the peak position of the generated bias magnetic field deviating from the center line C1 (that is, the center line C2).

In the third embodiment of the present invention, the relation between the distance from the center line C1 of the yoke and the magnitude (ratio) of the generated bias magnetic field is substantially the same as the relation in the second embodiment shown in FIG. 8. Namely, although the center line C1 of bias magnetic field generator 20 is aligned on the same line as the center line C2 of the laser beam spot, the peak position (100%) of the bias magnetic field deviates from the center line C1. Accordingly, the bias magnetic field before and behind the center of the laser beam spot in the tangential direction becomes left-right asymmetric, and the magnitude of the bias magnetic field is varied. Preferably, by shifting the peak position of the bias magnetic field in the forward rotation direction, the magnetic field forming the front mask becomes relatively larger, while the magnetic field forming the rear mask becomes relatively smaller.

Accordingly, in this case also, the range of the reproduction/recording margin against the error rate is extended, as shown in FIGS. 6(a) and 6(b), which contributes to increased reliability of the magneto-optical recording medium device.

Here, even in such the structure that the peak location of the bias magnetic field deviates in the backward direction against the center of the light beam spot, it is also possible to generate an optimal magnetic field. In principle, the yoke position may be either before or behind the light beam because the reproduction layer of the magneto-optical recording medium is maintained in the initial condition once after initialized by the front mask, unless the medium becomes in high temperature caused by the MSR reproduction power. However, in the case of the yoke positioned in the backward direction of the light beam, rotational delay movement or the like must be taken into consideration when necessary. Therefore, it is preferable that the yoke be positioned in the forward direction of the center of the light beam spot.

In the aforementioned description, the bias magnetic field generator is exemplarily disposed on the opposite side of the light beam output. However, it may also be possible to dispose on the same side, for example, by providing an electromagnet around the object lens on the optical head. Further, the magnetic field generation apparatus may not necessarily be of fixed type. Instead, the magnetic head may be constituted of either flying head type or contact head type. In short, the present invention can be realized by disposing a magnetic core of the magnetic head deviating from the light axis of the light beam.

Moreover, the present invention is not only applicable to the recording medium of disk form as having been described in the above embodiment of the present invention. The present invention may also be applicable to recording media of card form and tape form.

Additionally, the magneto-optical recording medium device includes a device for reproducing information from the magneto-optical recording medium, a device for recording/reproducing on and from the magneto-optical recording medium, and a processing unit such as a production unit for the magneto-optical recording medium, etc.

INDUSTRIAL APPLICABILITY

As the present invention having been described, according to the present invention, it becomes possible to produce both a magnetic field forming the front mask and a magnetic field forming the rear mask optimally by use of a single bias magnetic field generator, by shifting the peak position of the bias magnetic field in the magneto-optical recording medium device so as to deviate from the center of the laser beam spot in a tangential direction of the magneto-optical recording medium, enabling extended recording and reproduction margins.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. A magneto-optical recording medium device for at least reproducing information from a magneto-optical recording medium, comprising:
   an optical head irradiating a light beam onto the magneto-optical recording medium; and
   a bias magnetic field generator applying a bias magnetic field to the magneto-optical recording medium,
   wherein a peak position of the bias magnetic field applied by the bias magnetic field generator deviates from the center of a light beam spot irradiated onto the magneto-optical recording medium in a predetermined direction;
   wherein the bias magnetic field generator is structured of an electromagnet which includes a yoke extending along the radius direction of the magneto-optical recording medium and a coil wound around the yoke;
   wherein a cross section of the yoke in the radius direction is left-right asymmetric on the magneto-optical recording medium; and
   wherein the bias magnetic field generator is positioned so that the center position of the yoke in the approximate track direction coincides with the center position of the light beam spot in the approximate track direction.

2. A magneto-optical recording medium device for at least reproducing information from a magneto-optical medium, comprising:
   an optical head irradiating a light beam onto the magneto-optical recording medium; and
   a bias magnetic field generator applying a bias magnetic field to the magneto-optical recording medium,
   wherein a peak position of the bias magnetic field applied by the bias magnetic field generator deviates from the center of a light beam spot irradiated onto the magneto-optical recording medium in a predetermined direction;
   wherein the bias magnetic field generator is structured of an electromagnet which includes a yoke extending along the radius direction of the magneto-optical recording medium and a coil wound around the yoke;
   wherein the yoke is formed of a plurality of materials having different residual flux densities in the approximate track direction; and
   wherein the bias magnetic field generator is positioned so that the center position of the yoke in the approximate track direction coincides with the center position of the light beam spot in the approximate track direction.

3. A magneto-optical recording medium device at least reproducing information from a magneto-optical recording medium, comprising:
   an optical head irradiating a light beam onto the magneto-optical recording medium; and
   a bias magnetic field generator applying a bias magnetic field to the magneto-optical recording medium,
   wherein, when reproducing information from a predetermined track of the magneto-optical recording medium, the bias magnetic field generator simultaneously applies a magnetic field for forming a front mask on the track and a magnetic field for forming a rear mask on the track, having different magnitude from the magnitude of the magnetic field for the front mask.

4. The magneto-optical recording medium device according to claim 3,
   wherein the peak position of the bias magnetic field is set so that the magnetic field necessary for forming the front mask differs from the magnetic field necessary for forming the rear mask on an arbitrary track.

5. A magneto-optical recording medium device for at least reproducing information from a magneto-optical medium housed in a cartridge, comprising:
   an optical head having an object lens mounted thereon, irradiating a light beam on the magneto-optical recording medium;
   a cartridge holder holding the cartridge; and
   a bias magnetic field generator applying a bias magnetic field to the magneto-optical recording medium,
   wherein the bias magnetic field generator is disposed so as to shift the peak position of the bias magnetic field in the width direction of the cartridge holder against the axis of the object lens;
   wherein the bias magnetic field generator is structured of an electromagnet which includes a yoke extending along the radius direction of the magneto-optical recording medium and a coil wound around the yoke;
   wherein a cross section of the yoke in the radius direction is left-right asymmetric on the magneto-optical recording medium; and
   wherein the bias magnetic field generator is positioned so that the center position of the yoke in the approximate track direction coincides with the center position of the light beam spot in the approximate track direction.

6. A magneto-optical recording medium device for at least reproducing information from a magneto-optical medium housed in a cartridge, comprising:
   an optical head having an object lens mounted thereon, irradiating a light beam on the magneto-optical recording medium;
   a cartridge holder holding the cartridge; and
   a bias magnetic field generator applying a bias magnetic field to the magneto-optical recording medium,
   wherein the bias magnetic field generator is disposed so as to shift the peak position of the bias magnetic field in the width direction of the cartridge holder against the axis of the object lens;
   wherein the bias magnetic field generator is structured of an electromagnet which includes a yoke extending along the radius direction of the magneto-optical recording medium and a coil wound around the yoke;
   wherein the yoke is formed of a plurality of materials having different residual flux densities in the approximate track direction; and
   wherein the bias magnetic field generator is positioned so that the center position of the yoke in the approximate track direction coincides with the center position of the light beam spot in the approximate track direction.

* * * * *